United States Patent [19]

Miyaoka

[11] 4,115,808
[45] Sep. 19, 1978

[54] OPTICAL SIGNAL PLAY-BACK DEVICE WITH AUTO-FOCUSSING OF A LIGHT BEAM AT A RECORD CARRIER SURFACE

[75] Inventor: Senri Miyaoka, Zushi, Japan

[73] Assignee: Sony Corporation, Tokyo, Japan

[21] Appl. No.: 775,368

[22] Filed: Mar. 7, 1977

[30] Foreign Application Priority Data

Mar. 11, 1976 [JP] Japan .................................. 51-26310

[51] Int. Cl.² ........................ H04N 5/84; H04N 5/76; G11B 7/12
[52] U.S. Cl. .................................... 358/127; 250/566; 250/570; 358/128; 358/130; 365/215
[58] Field of Search ............... 358/127, 128, 130, 102; 340/173 LM; 352/103; 250/216, 566, 570; 365/215

[56] References Cited

U.S. PATENT DOCUMENTS

| 3,932,701 | 1/1976 | Adler | 358/128 |
| 3,959,581 | 5/1976 | Laub | 358/127 |

*Primary Examiner*—Howard W. Britton
*Attorney, Agent, or Firm*—Lewis H. Eslinger; Alvin Sinderbrand

[57] ABSTRACT

In a signal play-back device having a substantially flat record carrier or disc provided with first and second oppositely facing reflective surfaces and a signal recorded as variations in at least the second surface, and an optical system in which a first lens directs a laser light beam against the first record carrier surface for reflection by the latter and passage back through the first lens for focussing by the latter at an image point remote from the first record carrier surface, and a second lens effects a predetermined focussing of such image point at the second record carrier surface for scanning the recorded signal variations, with the light beam reflected from the latter, and having corresponding variations in its beam energy, passing back through the second lens toward a light detector for providing an output corresponding to such variations in beam energy, and in which the first and second lenses have magnification factors for maintaining the predetermined focussing of the image point at the second record carrier surface irrespective of movements of the latter toward and away from the second lens; a third lens is interposed in the path of the light beam between the second lens and the light detector and is dimensioned and positioned to focus, at the plane of the light-receiving surface of the light detector, a plane which is spaced from the second lens toward the third lens by a distance equal to the focal length of the second lens.

12 Claims, 10 Drawing Figures

OPTICAL SIGNAL PLAY-BACK DEVICE WITH AUTO-FOCUSSING OF A LIGHT BEAM AT A RECORD CARRIER SURFACE

BACKGROUND OF THE INVENTION

1. Field of the Invention

This invention relates generally to a signal playback device of the type in which a light beam scans a record carrier for reproducing a signal recorded thereon, and more particularly is directed to improvements in the optical system of such a signal play-back device by which a predetermined focussing of the scanning light beam at a surface of the record carrier on which the signal is recorded is automatically maintained in spite of vibrations or other movements of the record carrier in directions normal to such surface.

2. Description of the Prior Art

It has been proposed to optically record a signal, such as, a video signal, on a flat record carrier, for example, in the form of a disc, and to optically read the recorded signal by means of a light beam scanning a surface of the carrier on which the signal is recorded. In optically reading the recorded signal, as aforesaid, it is necessary that the light beam be maintained in a properly focussed condition in respect to the surface of the record carrier having the signal recorded thereon. However, when a rotated disc is employed as the record carrier, as is usually the case, some vibration or movement of the record disk in directions normal to its opposed surfaces is practically unavoidable. As a result of such vibration or movement, the distance between the surface of the disc having the signal recorded thereon and a lens provided for focussing the scanning light beam in respect to such surface is varied and undesirably disturbs the proper focussing of the light beam in respect to the surface of the record disc.

In order to maintain the proper focus of the light beam in respect to the surface of the record disk, it has been proposed to provide the optical signal play-back device with a servo system which detects the instantaneous position of the surface of the rotating record disk and, in response to any detected movement of such surface in the directions normal thereto, effects relative movement of the focussing lens and the plane of rotation of the rotating disk for maintaining the predetermined distance therebetween required for proper focussing of the light beam. However, such servo system is relatively complicated and costly and, furthermore, it is difficult for the servo system to accurately compensate for the rapid variation in the distance between the focussing lens and the record disc surface by reason of the relatively large masses that need to be moved for effecting the necessary compensation.

In view of the above, it has been proposed to provide an optical signal play-back device with an auto-focussing optical system for the light beam which scans the record carrier surface. For example, in U.S. Pat. Nos. 3,932,701 and No. 3,959,581, and in the present inventor's U.S. patent application Ser. No. 658,999, filed Feb. 18, 1976, and having a common assignee herewith, an auto-focussing optical system is employed with a record carrier, for example, a record disc, provided with first and second oppositely facing reflective surfaces and having the signal recorded as variations in at least the second surface. Such auto-focussing optical system may comprise a first lens directing a light beam from a source thereof against the first record carrier surface for reflection by the latter and passage back through the first lens for focussing by the latter at an image point remote from the first record carrier surface, and a second lens for effecting a predetermined focussing of such image point of the light beam on the second record carrier surface for scanning the recorded signal variations. The light beam reflected from the second record carrier surface, and having variations in its beam energy corresponding to the recorded signal variations, is passed back through the second lens toward a light detector for providing an output corresponding to the variations in the reflected beam energy. Further, in the foregoing auto-focussing optical system, the first and second lenses thereof have respective magnification factors selected so that the product thereof is equal to $1/\sqrt{2}$ for maintaining the predetermined focussing of the image point of the light beam in respect to the second record carrier surface irrespective of movements of the latter toward and away from the second lens.

Although the auto-focussing optical system, particularly as disclosed in detail in U.S. patent application Ser. No. 658,999, identified more fully above, is effective to maintain the proper focus of the light beam in respect to the surface of the record carrier having the signal recorded thereon, a number of full-reflecting and semi-reflecting mirrors have to be included in the optical system at various angles for establishing the path of the light beam between the source thereof and the light detector. As a practical matter, it is difficult and costly, in terms of the labor involved in assembling the optical system, to accurately locate the various mirrors in the optical signal playback device so as to ensure that the optical axis of the light beam, in passing through the second lens of the auto-focussing optical system prior to scanning the second surface of the record carrier, will exactly coincide with the optical axis of such second lens. In the event that the axis of the light beam, in thus passing through the second lens, deviates from the optical axis of the second lens, the direction of the light beam, when passing back through the second lens toward the light detector, will vary substantially in response to changes in the distance between the second lens and the second surface of the record carrier. The amount of light received by the light detector will be varied as a function of such substantial changes in the direction of the light beam directed toward the detector. Thus, the output of the light detector will be influenced by the movement of the record carrier toward and away from the second lens of the auto-focussing optical system and will no longer correspond accurately to the recorded signal variations.

OBJECTS AND SUMMARY OF THE INVENTION

Accordingly, it is an object of the present invention to provide an optical signal play-back device with an auto-focussing optical system, as aforesaid, and in which the light beam can be conveniently directed continuously at the light detector irrespective of movements of the record carrier in directions normal to its surfaces.

More particularly, it is an object of this invention to provide an optical play-back device with an auto-focussing optical system, as aforesaid, and in which the light beam reflected from the second record carrier surface can be continuously directed at the light detector irrespective of the movements of the second record carrier surface toward and away from the second lens of the optical system even when the axis of the light beam incident on such second lens deviates from the optical axis of the latter.

In accordance with an aspect of this invention, in an optical signal play-back device having a substantially flat record carrier, for example, a record disc, provided with first and second oppositely facing reflective surfaces and a signal recorded as variations in at least the second surface, and an optical system in which a first lens directs a light beam, for example, a laser light beam, from a source thereof against the first record carrier surface for reflection by the latter and passage back through the first lens for focussing by the latter at an image point remote from the first record carrier surface, and a second lens effects a predetermined focussing of the image point of the light beam in respect to the second record carrier surface for scanning the recorded signal variations, with the light beam reflected from the latter, and having corresponding variations in its beam energy, passing back through the second lens toward a light detector for providing an output corresponding to the variations in beam energy, and in which the first and second lenses have respective magnification factors proportioned relative to each other for maintaining the predetermined focussing of the image point in respect to the second record carrier surface irrespective of movements of the latter toward and away from the second lens; a third lens is interposed in the path of the light beam between the second lens and the light detector and is dimensioned and positioned to focus, at the plane of a light-receiving surface of the light detector, a plane which is spaced from the second lens toward the third lens by a distance equal to the focal length of the second lens.

The above, and other objects, features and advantages of this invention, will be apparent in the following detailed description of illustrative embodiments thereof which is to be read in connection with the accompanying drawings.

DESCRIPTION OF THE PREFERRED EMBODIMENTS

Figure 1:
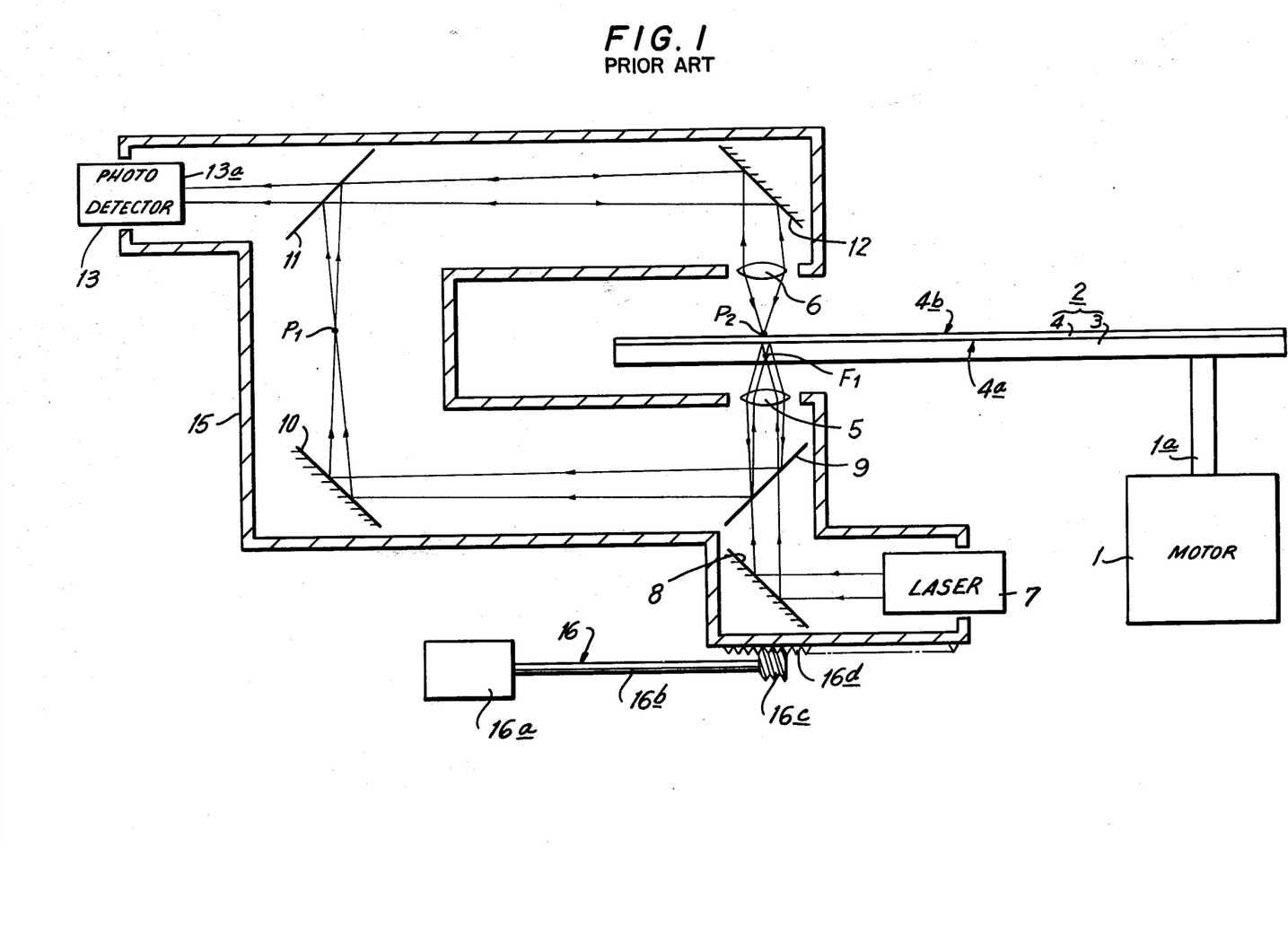
FIG. 1 is a schematic elevational view of an existing optical signal play-back device with an auto-focussing optical system, and which is shown with its housing in section for exposing the details of such optical system.

Referring to the drawings in detail, and initially to FIG. 1 thereof, it will be seen that, in an optical signal play-back device of the type to which the present invention is preferably applied, for example, an optical signal play-back device of the type disclosed in detail in U.S. patent application Ser. No. 658,999, identified more fully above, an electric motor 1 is suitably supported with its shaft 1a extending vertically, and a flat record carrier 2, in the form of a rotary disc, is rotatably coupled, at its center, with shaft 1a so as to be driven by the latter. The record disc 2 is shown on FIG. 1 to include a transparent disc 3, for example, of a synthetic resin or the like, having a video or other signal recorded in its upper surface in the form of corresponding variations in such surface constituted by pits or grooves, as is well known. A thin reflective metal layer 4 is coated on the upper surface of transparent disc 3 so as to follow the recorded signal variations in such surface. It will be apparent that the lower and upper surfaces 4a and 4b of reflective layer 4 constitute first and second oppositely facing reflective surfaces of record disc 2.

The optical signal play-back device of FIG. 1 is further shown to have an optical system including first and second lenses or lens systems 5 and 6 located below and above, respectively, record disc 2 and preferably having relatively narrow depths of focus. A light beam, for example, a parallel laser light beam, is emitted from a light source, such as, a laser 7, and is reflected by a mirror 8 so as to be directed from the latter through a semi-reflective mirror 9, the first lens 5 and the transparent disc 3 against the first or downwardly facing reflective surface 4a of record disc 2. The laser light beam incident on surface 4a is reflected by the latter and passed back through first lens 5 so as to be reflected by semi-reflective mirror 9 and then further reflected, in succession, by a mirror 10, a semi-reflective mirror 11 and a mirror 12 for passage through second lens 6 to the second or upwardly facing reflective surface 4b of record disc 2. The laser light beam, as reflected by surface 4b, is passed back through second lens 6 so as to be reflected by mirror 12 through semi-reflective mirror 11 for impingement on a light-receiving surface 13a of a light- or photo-detector 13.

Figure 3:
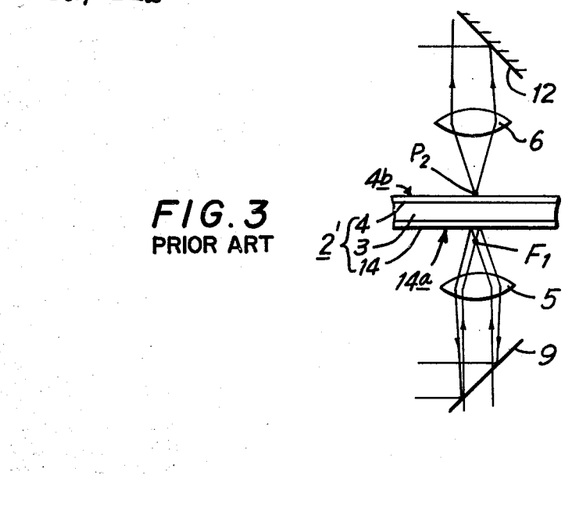
FIG. 3 is a fragmentary schematic view illustrating a portion of the optical signal play-back device of FIG. 1 with a modified form of record carrier.

In the optical signal play-back device shown on FIG. 1, the first and second reflective surfaces of record carrier 2 are defined by the downwardly and upwardly facing surfaces 4a and 4b, respectively, of the single reflective metal layer 4 provided on the upper surface of transparent disc 3, as described above. However, as shown on FIG. 3, a record carrier 2' for use in the optical signal play-back device of FIG. 1 may be comprised of an opaque disc 3 which, as before, has the video or other signal recorded in its upper surface which is covered by the reflective metal layer 4 defining the second or upwardly facing reflective surface 4b, while the bottom surface of disc 3 is covered by another reflective metal layer 14 defining the first or downwardly facing reflective surface 14a. It will be apparent that, in the case of the record carrier or disc 2 shown on FIG. 1, the recorded signal is represented by corresponding variations in both the first and second reflective surfaces 4a and 4b, whereas, in the case of the record carrier or disc 2' shown on FIG. 3, the first reflective surface 14a is smooth or uniform and has no variations therein, and the recorded signal is represented only by variations in the second reflective surface 4b.

Returning to FIG. 1, it will be seen that, in the optical signal play-back device there illustrated, lenses 5 and 6, layer 7, mirrors 9–12 and photo-detector 13 are all suitably mounted at respective fixed positions in a housing 15 for movement, as a unit, in the radial direction of disc 2. Such movement of housing 15 may be effected by a feed assembly 16 which is shown to comprise an electric motor 16a having its shaft 16b connected to a worm gear 16c meshing with a rack 16b on housing 15. It will be understood that, during rotation of record disc 2 by motor 1, the speed of rotation of motor 16a is suitably controlled so that the resulting radial movement of housing 15 will cause the light beam incident on reflective surface 4b to scan a spiral track thereon in which the video or other signal is recorded.

As previously noted, during rotation of record disc 2, it is inevitable that the latter will vibrate or move vertically, that is, in directions normal to its surfaces 4a and 4b, between lenses 5 and 6. The first lens 5 is preferably dimensioned and positioned in respect to record carrier 5 and the light source or laser 7 for focussing the light beam from the latter at a point $F_1$ which is spaced from the first or downwardly facing reflective surface 4a on FIG. 1 or 14A on FIG. 3 in one of the directions normal to such surface for the full range of the vibrations or movements of the record carrier. More particularly, in the case where the light beam received by first lens 5 from laser or light source 7 is a parallel light beam, as shown on FIG. 1, the point $F_1$ at which the light beam from laser 7 is focussed by first lens 5 is spaced from the first reflective surface 4a or 14a in the direction toward the first lens 5. On the other hand, when the light beam, as received by first lens 5 from source 7, is a diverging light beam, the point at which the light beam from source 7 is focussed by first lens 5 is spaced from the first reflective surface 4a or 14a in the direction away from first lens 5.

Since lenses 5 and 6 and mirrors 9–12 are fixedly located in housing 15, the length of the path of the light beam reflected from first reflective surface 4a or 14a through lens 5 and by way of mirrors 9,10,11 and 12 through lens 6 to second reflective surface 4b is constant even if the record carrier 2 moves vertically between lenses 5 and 6. Further, first lens 5 is dimensioned and positioned so that the light beam, as reflected by first reflective surface 4a or 14a is focussed by lens 5 at an image point $P_1$ which is located between mirrors 10 and 11 in all positions of the record disc 2 between lenses 5 and 6. Furthermore, the length of the above mentioned path of the light beam from first reflective surface 4a or 14a to second reflective surface 4b is selected so that, when record carrier 2 is at rest to provide predetermined distances between surface 4a or 14a and lens 5 and between surface 4b and lens 6, second lens 6 provides a predetermined focussing of the image point $P_1$ in respect to the surface 4b. Although FIG. 1 shows the condition in which the image point $P_1$ is just focussed at the reflective surface 4b to provide a second image point $P_2$ at such surface, the optical system shown on FIG. 1 can also be employed to provide a slightly underfocussed or overfocussed condition of the image point $P_1$ at the surface 4b. In any case, by providing a particular interrelation between the image magnification factors of first and second lenses 5 and 6, as described below, the predetermined or desired focus condition of image point $P_1$ of the light beam in respect to reflective surface 4b can be continuously maintained even when record disc 2 vibrates or moves vertically between lenses 5 and 6. More particularly, the predetermined or desired focus condition of image point $P_1$ in respect to reflective surface 4b is maintained irrespective of vertical movements of record disc 2 between lenses 5 and 6 when such lenses have image magnification factors $N_1$ and $N_2$, respectively, which are selected to satisfy the equation $N_1 \cdot N_2 = 1/\sqrt{2}$.

The manner in which the above interrelation of the image magnification factors $N_1$ and $N_2$ of lenses 5 and 6 ensures that the desired or predetermined focus condition of the light beam will be maintained at reflective surface 4b will now be described with reference to FIGS. 2A and 2B.

Figure 2A:
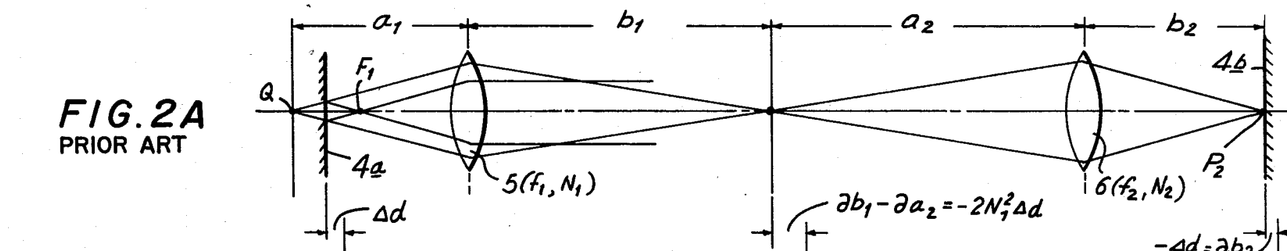
FIGS. 2A and 2B are simplified diagrammatic views of the optical system shown on FIG. 1, and to which reference will be made in explaining the operation thereof in achieving auto-focussing.

FIG. 2A illustrates the condition when the record disc is at rest so that reflective surfaces 4a and 4b thereof are at predetermined distances from lenses 5 and 6, respectively, and the image point $P_1$ is focussed by lens 6 to an image point $P_2$ precisely at the reflective surface 4b, as on FIG. 1. As previously described, since the light incident on lens 5 from source 7 is a parallel light beam, lens 5 focusses such light beam at the point $F_1$ which is spaced from reflective surface 4a in the direction toward lens 5. In view of the foregoing, the light beam, when reflected from surface 4a, diverges as if emitted from a point Q which is spaced from surface 4a at the side of the latter remote from focus point $F_1$ by a distance equal to the spacing of focus point $F_1$ from surface 4a.

If the length of the optical path from lens 5 to point Q is represented by $a_1$, the length of the optical path from lens 5 to image point $P_1$ is represented by $b_1$, the length of the optical path from image point $P_1$ to lens 6 is represented by $a_2$, the length of the optical path from lens 6 to image point $P_2$ is represented by $b_2$, and the focal lengths of the lenses 5 and 6 are represented by $f_1$ and $f_2$, respectively, then the following equations (1) and (2) can be established:

$$\frac{1}{a_1} + \frac{1}{b_1} = \frac{1}{f_1} \tag{1}$$

$$\frac{1}{a_2} + \frac{1}{b_2} = \frac{1}{f_2} \tag{2}$$

The image magnification factors $N_1$ and $N_2$ of lenses 5 and 6, respectively, can be expressed as follows:

$$N_1 = b_1/a_1 \tag{3}$$

$$N_2 = b_2/a_2 \tag{4}$$

Equation (1) can be rewritten as:

$$f_1 = \frac{a_1 \cdot b_1}{a_1 + b_1} = \frac{b_1/a_1 \cdot a_1}{1 + b_1/a_1}$$

By substituting equation (3) in the above, the following equation (5) is obtained:

$$f_1 = \frac{N_1}{N_1 + 1} \cdot a_1 \tag{5}$$

Similarly, equation (2) can be rewritten as:

$$f_2 = \frac{a_2 \cdot b_2}{a_2 + b_2} = \frac{b_2/a_2 \cdot a_2}{1 + b_2/a_2}$$

By substituting equation (4) in the above, the following equation (6) is obtained:

$$f_2 = \frac{N_2}{N_2 + 1} \cdot a_2 \quad (6)$$

Further, equations (1) and (2) can be rewritten to provide the below equations (7) and (8), respectively:

$$b_1 = f_1 \cdot \frac{a_1}{a_1 - f_1} \quad (7)$$

$$b_2 = f_2 \cdot \frac{a_2}{a_2 - f_2} \quad (8)$$

By differentiating equations (7) and (8) with $a_1$ and $a_2$, respectively, the following equations (9) and (10) are obtained:

$$\frac{\delta b_1}{\delta a_1} = f_1 \left( \frac{1}{a_1 - f_1} - \frac{a_1}{(a_1 - f_1)^2} \right) = -\frac{f_1^2}{(a_1 - f_1)^2} \quad (9)$$

$$\frac{\delta b_2}{\delta a_2} = f_2 \left( \frac{1}{a_2 - f_2} - \frac{a^2}{(a_2 - f_2)^2} \right) = -\frac{f_2}{(a_2 - f_2)^2} \quad (10)$$

If equations (5) and (6) are substituted in equations (9) and (10), respectively, the following equations (11) and (12) are obtained:

$$\frac{\delta b_1}{\delta a_1} = -N_1^2 \quad (11)$$

$$\frac{\delta b_2}{\delta a_2} = -N_2^2 \quad (12)$$

As previously noted, the image magnification factors $N_1$ and $N_2$ of lenses 5 and 6 are selected to satisfy the equation $$N_1 \cdot N_2 = 1/\sqrt{2} \quad (13)$$

If equation (13) is substituted in equation (12), the following equation (14) is obtained:

$$\frac{\delta b_2}{\delta a_2} = -\frac{1}{2N_1^2} \quad (14)$$

Accordingly, when record disc 2 is vibrated or moved vertically between lenses 5 and 6 and the extent of such movement is within a relatively small range, as is usually the case, the amounts $\delta a_1$ and $\delta b_1$ by which the distances or lengths $a_1$ and $b_1$ are changed with respect to lens 5 will satisfy equation (11) and the amounts $\delta a_2$ and $\delta b_2$ by which distances $a_2$ and $b_2$ are changed with respect to lens 6 will satisfy equation (14).

It will be apparent that, when the position of surface 4a in respect to lens 5 is changed by the distance $\Delta d$, the position of surface 4b in respect to lens 6 will change by $-\Delta d$. In other words, when surface 4a is moved toward lens 5 by the distance $\Delta d$, surface 4b moves away from lens 6 by the same distance, as shown on FIG. 2B. Conversely, when surface 4a moves away from lens 5 by a certain distance, surface 4b moves closer to lens 6 by that same distance.

Figure 2B:
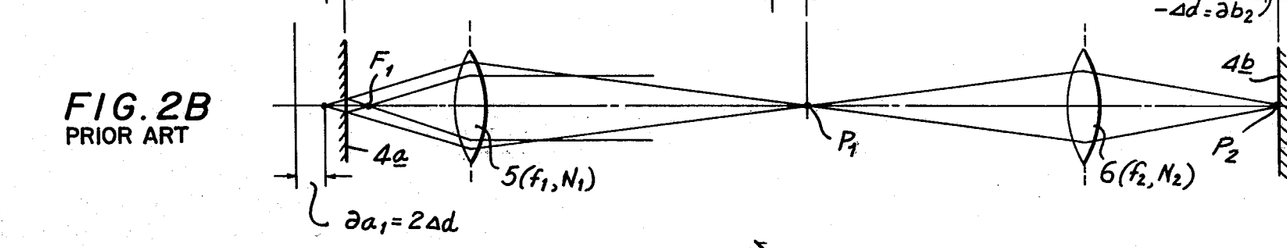

When the position of surface 4a relative to lens 5 is changed by $\Delta d$, the position of point Q is changed by $2\Delta d$, as shown on FIG. 2B. Thus, the change $\delta a_1$ in distance $a_1$ is $2\Delta d$ and, if this change $2\Delta d$ is substituted for $\delta a_1$ in equation (11) the change $\delta b_1$ of distance $b_1$ becomes $2N_1^2\Delta d$. Since the optical path length between lenses 5 and 6 is constant, the change $\delta a_2$ of distance $a_2$ is the same as the change $\delta b_1$ of distance $b_1$, but opposite in direction or sign. Therefore, $$\delta a_2 = -\delta b_1 = 2N_1^2 \Delta d \quad (15)$$

Substituting equation (15) in equation (14) and solving the latter for $\delta b_2$, as below, $$\frac{\delta b_2}{2N_1^2 \Delta d} = -\frac{1}{2N_1^2}$$

$$\delta b_2 = -\frac{1}{2N_1^2} \cdot 2N_1^2 \Delta d$$

we obtain $\delta b_2 = -\Delta d$.

From the above, it is apparent that the change $\delta b_2$ in distance $b_2$ is precisely equal to the change in the distance from surface 4b to lens 6. Thus, the distance from lens 6 to surface 4b is always equal to the distance from lens 6 to the image point $P_2$ so that the light beam is always just focussed at surface 4b irrespective of vibration or vertical movements of record disc 2 between lenses 5 and 6. Accordingly, the optical system described above with reference to FIGS. 1, 2A and 2B effects auto-focussing, that is, maintains a desired focus condition of the light beam in respect to the record carrier surface 4b, without employing a servo-mechanism or the like.

Figure 4:
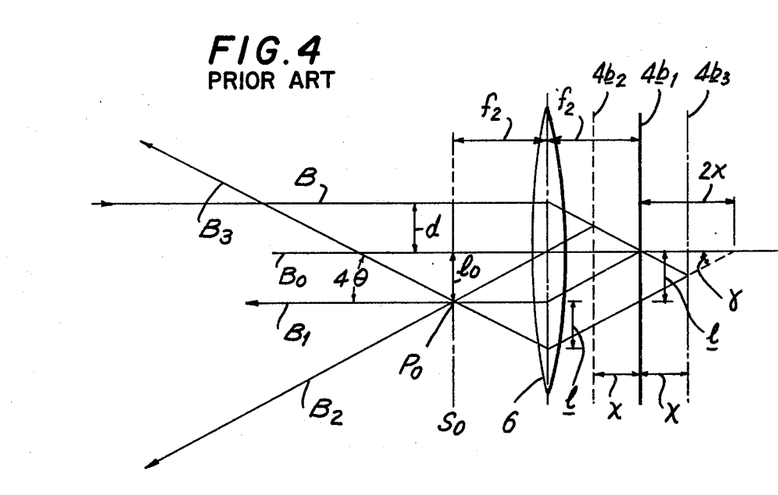
FIGS. 4 and 5 are diagrammatic views to which reference will be made in explaining a problem encountered in the optical signal play-back device of FIG. 1.
Figure 5:
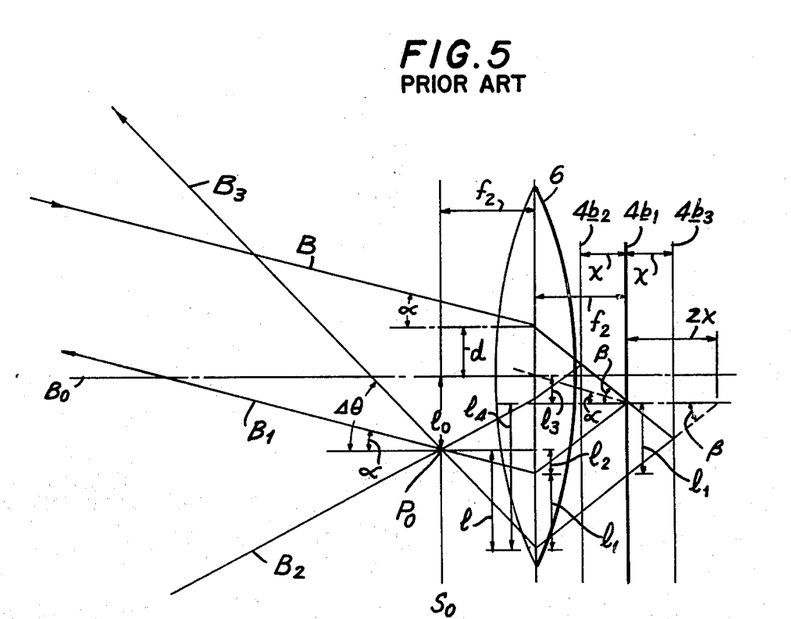

However, if the axis B of the light beam, as directed from mirror 12 to lens 6, deviates from the optical axis $B_o$ of lens 6, then the direction of the light beam axis, after reflection from surface 4b of record disc 2 and passage through lens 6, will vary substantially, as indicated at $B_1$, $B_2$ and $B_3$ on FIGS. 4 and 5, in response to changes in the distance from reflective surface 4b to lens 6. It will be apparent that, if the light- or photo-detector 13 is positioned, for example, so that its surface 13a will have the full cross-section of the light beam impinging thereon when the light beam axis is positioned at $B_1$ on FIG. 4 or FIG. 5 in consequence of the reflective surface 4b being in a reference position indicated in full lines at $4b_1$, for example, as when the record disc 2 is at rest, then the movement of surface 4b toward lens 6 to the position $4b_2$, or away from lens 6 to the position $4b_3$, and the consequent change in the direction of the light beam axis to $B_2$ or $B_3$, respectively, will cause less than the full cross-sectional area of the reflected light beam to impinge on the light receiving surface 13a of detector 13. Thus, the output of light- or photo-detector 13 is influenced by the movement of surface 4b toward and away from lens 6 and will no longer accurately correspond to the recorded signal variations in such surface.

If as shown on FIG. 4 the axis B of the light beam incident on lens 6 from mirror 12 is parallel to optical axis $B_o$ of lens 6 but spaced therefrom by the distance $c$ and the surface 4b is moved from its reference position $4b_1$ toward or away from lens 6 by a distance $x$, then the angle $\Delta\theta$ between the optical axis $B_o$ and the axis $B_2$ or $B_3$ of the light beam directed from lens 6 toward the detector 13 with surface 4b in the position $4b_2$ or $4b_3$, respectively, can be determined as follows:

$$\tan \gamma = \frac{l}{2x} = \frac{d}{f_2} \quad (16)$$

in which $\gamma$ is the angle of incidence and reflection of the light beam axis on surface 4b, $l$ is the distance perpendicular to optical axis $B_o$ that the axis of the light beam is displaced upon movement of surface 4b the distance $x$, and $f_2$ is the focal length of lens 6.

Equation (16) can be rewritten:

$$l = (2 \times d)/f_2 \quad (17)$$

Further, from FIG. 4, it will be seen that $$\tan \Delta\theta = l/f_2 \quad (18)$$

By substituting equation (17) in equation (18), the following is obtained:

$$\tan \Delta\theta = (2d.x)/f_2^2 \quad (19)$$

For the more general situation shown on FIG. 5, that is, in which the axis B of the light beam incident on lens 6 from mirror 12 impinges on lens 6 at a distance $d$ from the optical axis $B_o$ and also is at an angle $\alpha$ in respect to the latter, the angle $\Delta\theta$ can be similarly determined as follows (with reference to the symbols appearing on FIG. 5):

$$l_1 = 2x \tan \beta \quad (20)$$
$$l_3 = f_2 \tan \alpha \quad (21)$$
$$\tan \beta = \frac{d + l_3}{f_2} = \frac{d + f_2 \tan \alpha}{f_2} \quad (22)$$

Therefore, equation (20) can be rewritten as:

$$l_1 = 2x \cdot \frac{d + f_2 \tan \alpha}{f_2} \quad (23)$$

Further, as shown, $l_2 = f_2 \tan \alpha$, and $l = l_1 + l_2$, and the latter can be rewritten as:

$$l = 2x \cdot \frac{d + f_2 \tan \alpha}{f_2} + f_2 \tan \alpha \quad (24)$$

It will also be seen that $\tan \Delta\theta = l/f_2$, and upon substitution of equation (24) in the foregoing, there is obtained:

$$\tan \Delta\theta = \frac{2x}{f_2} \left( \frac{d}{f_2} + \tan \alpha \right) + \tan \alpha$$

or $$\tan \Delta\theta = \tan \alpha + \frac{2x}{f_2} \left( \frac{d}{f_2} + \tan \alpha \right) \quad (25)$$

It will be apparent from each of the above equations (19) and (25) that vibration or vertical movement of record disc 2 relative to lens 6 causes a relatively large change in the direction of the light beam directed from lens 6 toward photo-detector 13 except in the case where $d=o$ and $\alpha=o$, with the result that the output of detector 13 will not represent an accurate reproduction of the recorded signal. Further, as previously indicated, it is very difficult and costly, in terms of the labor involved, to so precisely locate mirrors 9–12 in housing 15 as to ensure that the conditions $d=o$ and $\alpha=o$ are achieved.

However, it will be seen on each of FIGS. 4 and 5 that the light beam axes $B_1$, $B_2$ and $B_3$ extending from lens 6 toward detector 13 for the positions $4b_1$, $4b_2$ and $4b_3$, respectively, of surface 4b all pass through a common point $P_o$ in a plane $S_o$ which is spaced from lens 6 in the direction toward the detector 13 by a distance equal to the focal length $f_2$ of lens 6. The fact that all of the light beam axes $B_1$, $B_2$ and $B_3$ pass through the common point $P_o$ in plane $S_o$ can be established as follows with reference to FIG. 5:

$$l_o = l_3 + l_4 - l \quad (26)$$

in which $l_o$ is the distance of point $P_o$ from the optical axis $B_o$ of lens 6.

Substituting $l_3 = f_2 \tan \alpha$, $l_4 = (f_2 + 2x) \tan \beta$, and equation (24) in the above equation (26), there is obtained:

$$l_0 = f_2 \tan \alpha + (f_2 + 2x)\tan \beta - \quad (27)$$
$$\left[ 2x \cdot \frac{d + f_2 \tan \alpha}{f_2} + f_2 \tan \alpha \right]$$

Substituting equation (22) in equation (27) provides:

$$l_0 = f_2 \tan \alpha + \frac{(f_2 + 2x)(d + f_2 \tan \alpha)}{f_2} \quad (28)$$
$$- \left[ 2x \cdot \frac{d + f_2 \tan \alpha}{f_2} + f_2 \tan \alpha \right]$$

The above equation (28) can be easily simplified to provide:

$$l_o = d + f_2 \tan \alpha \quad (29)$$

From equation (29) it is apparent that the value of $l_o$ is independent of $x$ and is determined only by $f_2$, that is, the focal length of lens 6, and by the values of $d$ and $\alpha$ which may vary from one device to another, but which are constant or unchanging in any particular device. Thus, the point $P_o$ is a fixed point in plane $S_o$ for any particular signal play-back device irrespective of any movement of reflective surface 4b toward or away from lens 6. Insofar as the values of $d$ and $\alpha$ may vary from one signal play-back device to another, the effect thereof would be to merely change the distance $l_o$ of the point $P_o$ from the optical axis $B_o$, but the point $P_o$ would still be a fixed point in the plane $S_o$.

Figure 6:
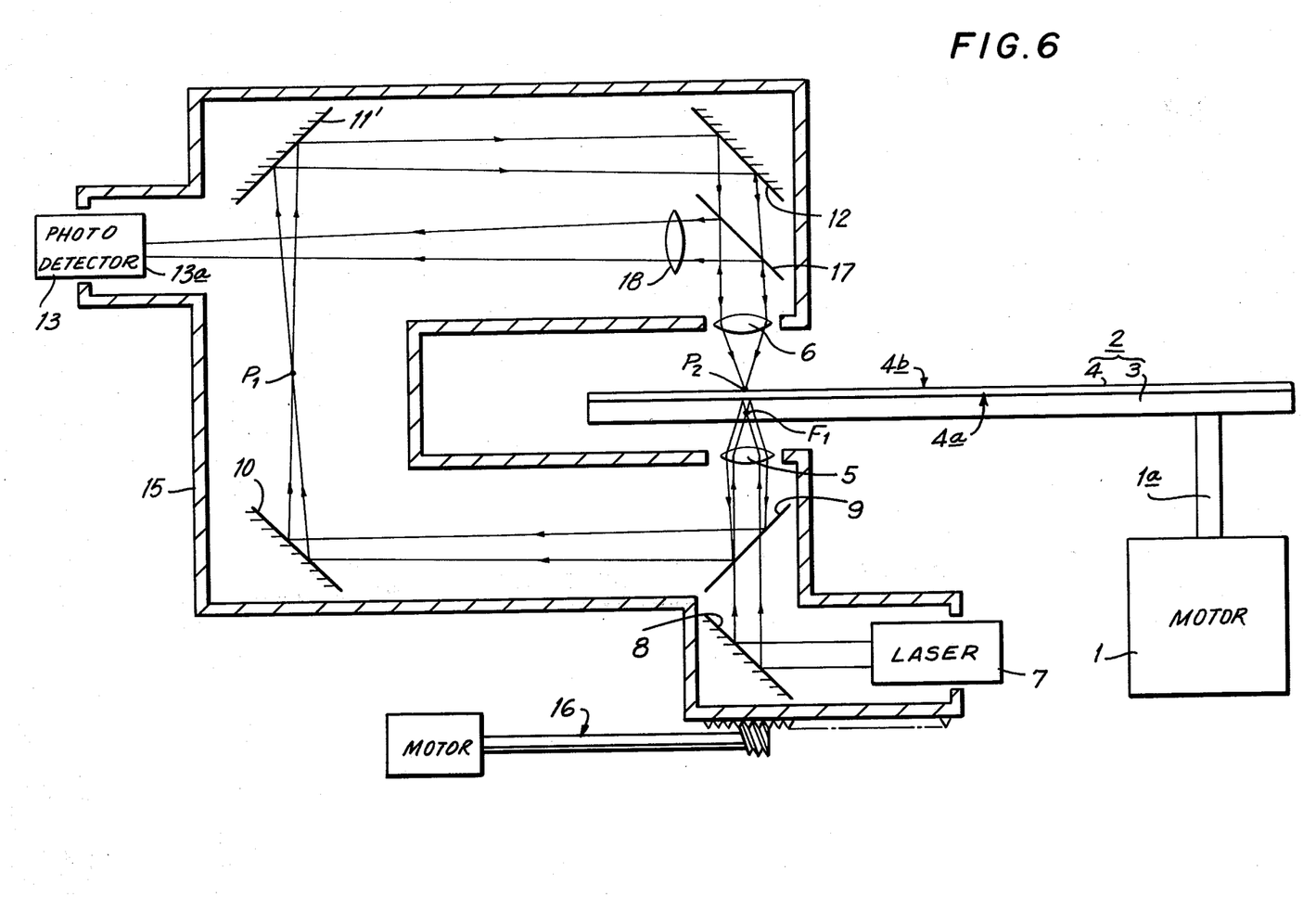
FIG. 6 is a schematic view similar to that of FIG. 1, but showing an optical signal play-back device with an auto-focussing optical system according to an embodiment of this invention.

Referring now to FIG. 6, it will be seen that an optical signal play-back device according to this invention is there shown to be generally similar to the device described above with reference to FIG. 1 and has its several components or parts identified by the same reference numerals as were used for identifying the corresponding parts on FIG. 1. However, in the optical system of the signal play-back device according to this invention, as illustrated on FIG. 6, a semi-reflective mirror 17 is interposed in the path of the light beam between mirror 12 and lens 6. Thus, the light beam incident on lens 6 from mirror 12 passes through semi-reflective mirror 17, and the light beam, after being reflected by surface 4b and passed back through lens 6, is reflected by mirror 17 so as to be directed toward light-or photo-detector 13. Furthermore, in accordance with this invention, a third lens or lens system 18 is interposed between mirror 17 and detector 13, that is, interposed in the path of the light beam returning from lens 6 to detector 13. It will also be seen that, in the embodiment of the invention shown on FIG. 6, the mirror 11', which corresponds to the mirror 11 on FIG. 1, is out of the path of the light beam returning from lens 6 to detector 13, and, therefore, can be a full reflecting mirror.

Figure 7:
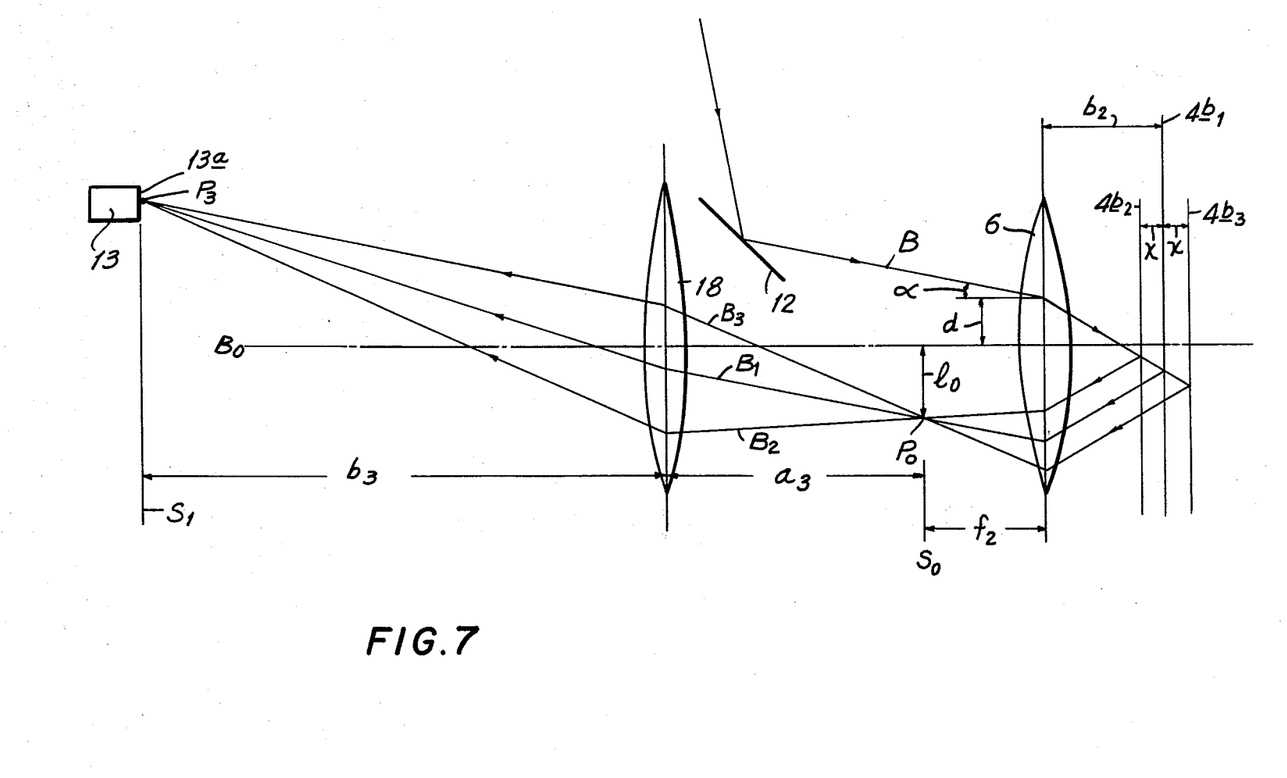
FIG. 7 is a diagrammatic view to which reference will be made in explaining the operation of the optical system shown on FIG. 6.

As shown particularly on FIG. 7, the third lens 18 provided in accordance with this invention is dimensioned and positioned to focus, at the plane $S_1$ of the light receiving surface 13a of detector 13, a plane $S_o$ which is spaced from lens 6 toward lens 18 by a distance equal to the focal length $f_2$ of lens 6. In order to achieve the foregoing, the focal length $f_3$ of the third lens 18, the distance $a_3$ along the optical path from the plane $S_o$ to the lens 18, and the distance $b_3$ along the optical path from the lens 18 to the plane $S_1$ of the light receiving surface 13a, which is normal to the optical path, are selected to satisfy the following relation:

$$\frac{1}{f_3} = \frac{1}{a_3} + \frac{1}{b_3} \tag{29}$$

By reason of the lens 18, dimensioned and positioned as described above, an image of the fixed point $P_o$ in plane $S_o$ is focussed at a corresponding fixed point $P_3$ in the plane $S_1$ of the light receiving surface 13a of detector 13. Thus, as surface 4b moves toward and away from lens 6 in response to vertical movement or vibration of record disc 2 between lenses 5 and 6, the paths $B_1$, $B_2$ and $B_3$ along which the light beam travels toward detector 13 after being reflected by surface 4b and passing back through lenses 6 and 18 are made to intersect the plane $S_1$ at the fixed point $P_3$. Accordingly, if the detector 13 is initially positioned to center the point $P_3$ in respect to its light receiving surface 13a, the light beam reflected from surface 4b, and having its energy varied or modulated in accordance with the recorded signal, will impinge uniformly on light receiving surface 13a irrespective of the vibration or vertical movements of record disc 2 between lenses 5 and 6 for ensuring that the output of detector 13 will accurately reproduce the recorde signal even when $d$ and/or $\alpha$ have finite values.

Although the position of the point $P_3$ in plane $S_1$ may vary from one signal play-back device to another in accordance with the particular value of the distance $l_o$ from the point $P_o$ to the axis $B_o$, as determined by the values of $d$ and $\alpha$, it will be apparent that the position of point $P_3$ will be fixed in any particular signal play-back device, and that the detector 13 can be conveniently adjusted initially, for example, with the record disc 2 at rest to dispose its surface 4b at the reference position 4b, so as to substantially center the point $P_3$ in respect to light receiving surface 13a of detector 13.

It will be apparent that, in the embodiment of the invention illustrated on FIGS. 6 and 7, the light beam passes through the additional or third lens 18 only after being reflected from surface 4b. Therefore, in order to effect auto-focussing of the light beam in respect to surface 4b it is sufficient that the lenses 5 and 6 have image magnification factors $N_1$ and $N_2$ selected to satisfy the relation $N_1 \cdot N_2 = 1/\sqrt{2}$, as described previously in respect to the signal play-back device of FIGS. 1, 2A and 2B.

Figure 8:
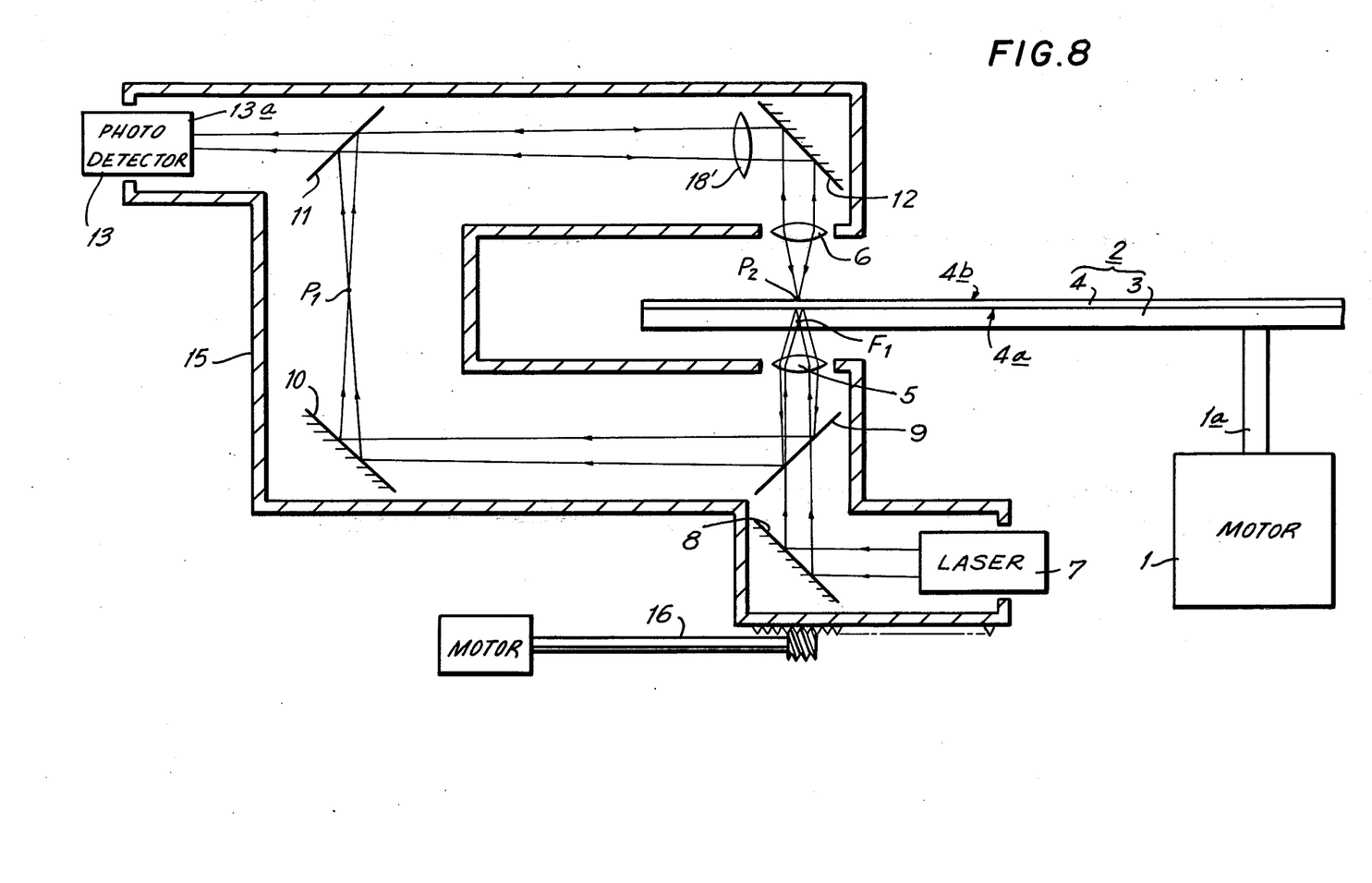
FIG. 8 is also a schematic view similar to that of FIG. 1, but showing an optical signal play-back device with an auto-focussing optical system according to another embodiment of the present invention.

However, as shown on FIG. 8, in which the various parts of the illustrated signal play-back device are again identified by the same reference numerals used in connection with the corresponding parts on FIG. 1, the third or additional lens 18' provided in accordance with this invention may be interposed in the path of the light beam between image point $P_1$ and lens 6 as well as in the return path of the light beam from lens 6 to collector 13. For example, the lens 18' may be interposed in the optical path between mirrors 11 and 12, as shown.

In the case of the embodiment of FIG. 8, the previously described auto-focussing of the image point $P_1$ at the point $P_2$ on surface 4b is achieved by selecting the image magnification factor $N_1$ of lens 5 and the image magnification factor $N'_2$ of lenses 6 and 18', considered as a combined or compound lens, to satisfy the relation $N_1 \cdot N'_2 = 1/\sqrt{2}$. Thus, as the record disc 2 moves vertically between lenses 5 and 6 to dispose surface 4b in the positions indicated at $4b_1$, $4b_2$ and $4b_3$ on FIG. 9, the lens 5 focuses the beam reflected from surface 4a at image points $P_1$, $P'_1$ and $P''_1$, respectively, on FIG. 9, and the lenses 6 and 18' combine to focus the above image points at the points $P_2$, $P'_2$ and $P''_2$, respectively, which, in all cases, correspond to the positions of surface 4b.

Figure 9:
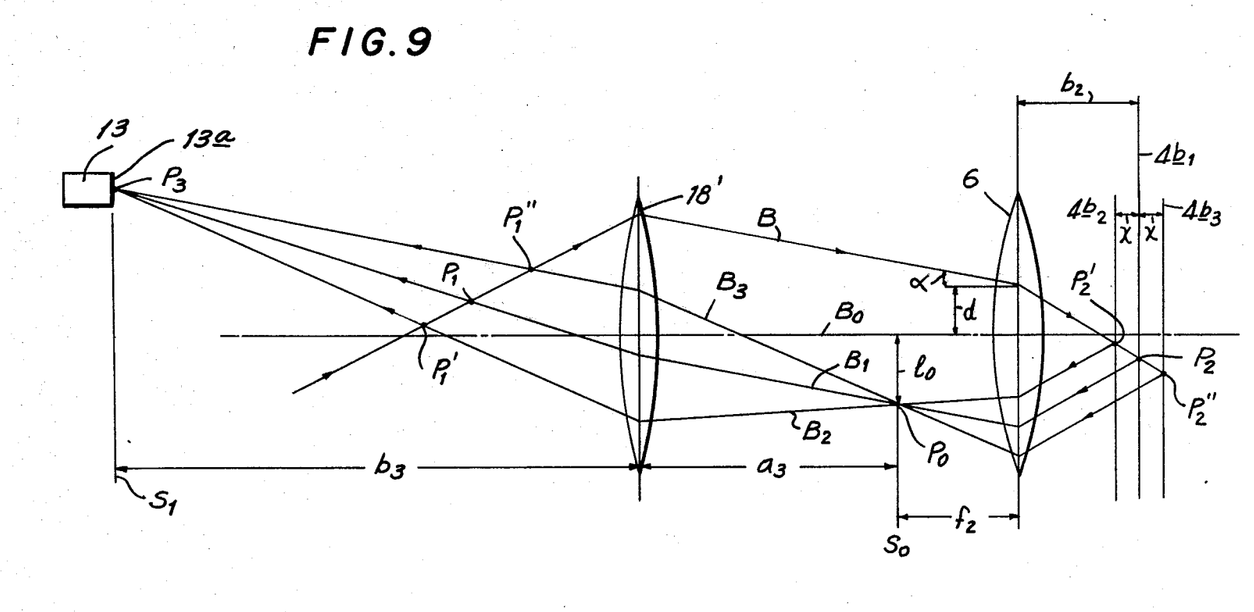
FIG. 9 is a diagrammatic view to which reference will be made in explaining the operation of the optical system on FIG. 8.

Furthermore, in the embodiment of FIGS. 8 and 9, the additional or third lens 18' is positioned and dimensioned to focus, at the plane $S_1$ of light receiving surface 13a of detector 13, the plane $S_o$ which is spaced from lens 6 toward lens 18' by a distance equal to the focal length $f_2$ of the lens 6. As in the embodiment of FIGS. 6 and 7, the foregoing is achieved by relating the focal length $f_3$ of lens 18' to the distances $a_3$ and $b_3$ on FIG. 9 as follows:

$$\frac{1}{f_3} = \frac{1}{a_3} + \frac{1}{b_3}$$

By reason of the foregoing, the embodiment of FIGS. 8 and 9 operates in the same manner as has been described above with reference to the embodiment of FIGS. 6 and 7 to ensure that the light beam reflected from surface 4b and having its energy modulated or varied in accordance with the recorded signal will impinge at a fixed point $P_3$ in the plane $S_1$ of libht receiving surface 13a irrespective of the vibration or vertical movement of record carrier 2, even when $d$ and/or $\alpha$ have finite values. Accordingly, detector 13 will have an output accurately corresponding to the recorded signal even though the light beam, as incident on lens 6, has its axis deviating from the optical axis of the lens 6.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a signal play-back device having a substantially flat record carrier with first and second oppositely facing reflective surfaces and a signal recorded as variations in at least said second surface, a light source emitting a light beam for scanning the recorded signal variations and providing correspondingly varied reflected beam energy, and light detecting means having a surface for receiving said varied reflected beam energy and providing a corresponding output; an optical system comprising first lens means directing said light beam from said source against said surface for reflection by the latter and focussing the light beam reflected from said first surface at an image point remote from said first surface, second lens means for effecting a predetermined focussing of said image point of the light beam onto said second surface and directing the light beam reflected from said second surface toward said surface of the light detecting means, the magnification factors of said first and second lens means being proportioned relative to each other for maintaining said predetermined focussing of said image point at said second surface irrespective of variations in the distance of said second surface from said second lens means, and third lens means interposed in the path of the light beam between said second lens means and said light detecting means and being dimensioned and positioned to focus, at the plane of said surface of the light detecting means, a plane which is spaced from said second lens means toward said third lens means by a distance equal to the focal length of said second lens means.

2. A signal play-back device according to claim 1; in which said first lens means is dimensioned and positioned in respect to said record carrier and said light source for focussing said light beam from the latter at a point which is spaced from said first surface in a direction normal to the latter for the full range of said variations in the distance of said second surface from said second lens means.

3. A signal play-back device according to claim 2; in which said first and second lens means have respective magnification factors $N_1$ and $N_2$ satisfying the equation $$N_1 \cdot N_2 = 1/\sqrt{2}.$$

4. A signal play-back device according to claim 2; in which said third lens means is also interposed in the path of the light beam between said image point of the latter and said second lens means; and in which said first lens means has a magnification factor $N_1$ and said second and third lens means, in combination, have a magnificaaion factor $N'_2$ satisfying the equation $N_1 \cdot N'_2 = 1/\sqrt{2}.$ 5. A signal play-back device according to claim 1; in which said third lens means has a focal length $f_3$ which satisfies the following equation $$1/f_3 = 1/a_3 + 1/b_3$$

in which $a_3$ is the distance from said third lens means to said plane spaced from the second lens means by said focal length of the latter, and $b_3$ is the distance from said third lens means to said plane of the surface of said light detecting means.

6. A signal play-back device according to claim 1; in which said record carrier includes a substantially flat transparent base member and a reflective metal layer on one of the faces of said base member for defining said first and second reflective surfaces at the sides of said reflective metal layer which face toward and away from, respectively, said base member.

7. A signal play-back device according to claim 1; in which said record carrier includes a substantially flat base member and reflective metal layers on the opposite faces of said base member for defining said first and second reflective surfaces.

8. A signal play-back device according to claim 1; in which said optical system further comprises a plurality of reflecting mirrors establishing an optical path between said first and second lens means, and from said second lens means through said third lens means to said light detecting means.

9. A signal play-back device according to claim 1; in which said light beam is a parallel light beam as received by said first lens means from said light source, and in which said point at which the light beam from said source is focussed by said first lens means is spaced from said first surface in the direction toward said first lens means.

10. A signal play-back device according to claim 1; in which said light beam is a diverging beam as received by said first lens means from said source, and in which said point at which the light beam from said source is focussed by said first lens means is spaced from said first surface in the direction away from said first lens means.

11. A signal play-back device according to claim 1; further comprising a common housing supporting said light source, said photo-detecting means and said optical system in fixed relation to each other, and being movable relative to said record carrier for said scanning of the recorded signal variations.

12. A signal play-back device according to claim 11; in which said record carrier is in the form of a disc and is rotated about a central axis perpendicular to said first and second reflective surfaces, and said common housing is movable in a direction extending radially in respect to said axis.

* * * * *